US012159588B2

(12) United States Patent
Chen

(10) Patent No.: US 12,159,588 B2
(45) Date of Patent: Dec. 3, 2024

(54) PIXEL CIRCUIT AND DISPLAY PANEL

(71) Applicant: Wuhan China Star Optoelectronics Semiconductor Display Technology Co., Ltd., Hubei (CN)

(72) Inventor: Tao Chen, Hubei (CN)

(73) Assignee: Wuhan China Star Optoelectronics Semiconductor Display Technology Co., Ltd., Wuhan (CN)

(*) Notice: Subject to any disclaimer, the term of this patent is extended or adjusted under 35 U.S.C. 154(b) by 0 days.

(21) Appl. No.: 18/522,517

(22) Filed: Nov. 29, 2023

(65) Prior Publication Data

US 2024/0169922 A1 May 23, 2024

Related U.S. Application Data

(63) Continuation of application No. PCT/CN2023/104262, filed on Jun. 29, 2023.

(30) Foreign Application Priority Data

Nov. 23, 2022 (CN) ........................ 202211478162.7

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01);
(Continued)

(58) Field of Classification Search
None
See application file for complete search history.

(56) References Cited

U.S. PATENT DOCUMENTS 10,242,622 B2 3/2019 Tseng et al.
10,347,181 B2 7/2019 Zhu et al.
(Continued)

FOREIGN PATENT DOCUMENTS

CN 106910468 6/2017
CN 107591124 1/2018
(Continued)

OTHER PUBLICATIONS

International Search Report and the Written Opinion Dated Aug. 21, 2023 From the International Searching Authority Re. Application No. PCT/CN2013/104262 and Its Translation Into English. (19 Pages).

*Primary Examiner* — Christopher J Kohlman

(57) ABSTRACT

A pixel circuit including a drive transistor connected between a first power supply line and a second power supply line; a first compensation transistor having a first electrode electrically connected to a gate of the drive transistor, and a gate electrically connected to a scan line; a second compensation transistor having a first electrode electrically connected to a second electrode of the first compensation transistor, a second electrode electrically connected to a first electrode or a second electrode of the drive transistor, and a gate electrically connected to a first control line, and a third compensation transistor having a first electrode electrically connected to the second electrode of the first compensation transistor and the first electrode of the second compensation transistor, a gate electrically connected to a second control line, and a second electrode electrically connected to a first potential line.

19 Claims, 6 Drawing Sheets

(52) U.S. Cl.
CPC . *G09G 2310/08* (2013.01); *G09G 2320/0247* (2013.01); *G09G 2320/045* (2013.01); *G09G 2330/021* (2013.01)

(56) References Cited

U.S. PATENT DOCUMENTS

| | | | | |
|---|---|---|---|---|
| 2022/0343823 | A1* | 10/2022 | Wang | G09G 3/32 |
| 2022/0358879 | A1 | 11/2022 | Wang et al. | |
| 2023/0402005 | A1 | 12/2023 | Liu et al. | |

FOREIGN PATENT DOCUMENTS

| | | |
|---|---|---|
| CN | 111754938 | 10/2020 |
| CN | 114078430 | 2/2022 |
| CN | 114582287 | 6/2022 |
| CN | 115083335 | 9/2022 |
| CN | 115938275 | 4/2023 |
| KR | 10-2015-0129234 | 11/2015 |

* cited by examiner

PIXEL CIRCUIT AND DISPLAY PANEL

RELATED APPLICATIONS

This application is a Continuation of PCT Patent Application No. PCT/CN2023/104262 having International filing date of Jun. 29, 2023, which claims the benefit of priority of Chinese Patent Application No. 202211478162.7 filed on Nov. 23, 2022. The contents of the above applications are all incorporated by reference as if fully set forth herein in their entirety.

FIELD AND BACKGROUND OF THE INVENTION

The present disclosure relates to the field of display technologies, and more particularly, to a pixel circuit and a display panel.

In the case of low-frequency driving, the duration of a frame is long, and therefore, the luminance of the pixel circuit in the duration of the frame is changed greatly, which causes a large flicker to be perceived by human eyes, and affects the display quality.

SUMMARY OF THE INVENTION

The present disclosure provides a pixel circuit and a display panel.

According to an aspect of the present disclosure, a pixel circuit is provided. The pixel circuit includes a drive transistor, a first compensation transistor, a second compensation transistor, and a third compensation transistor. The drive transistor is connected between a first power supply line and a second power supply line. A first electrode of the first compensation transistor is electrically connected to a gate of the drive transistor. A gate of the first compensation transistor is electrically connected to a scan line. A first electrode of the second compensation transistor is electrically connected to a second electrode of the first compensation transistor. A second electrode of the second compensation transistor is electrically connected to a first electrode of the drive transistor or to a second electrode of the drive transistor. A gate of the second compensation transistor is electrically connected to a first control line. A first electrode of the third compensation transistor is electrically connected to the second electrode of the first compensation transistor and the first electrode of the second compensation transistor. A gate of the third compensation transistor is electrically connected to a second control line. A second electrode of the third compensation transistor is electrically connected to a first potential line.

According to another aspect of the present disclosure, a display panel is provided. The display panel includes a pixel circuit. The pixel circuit includes a drive transistor, a first compensation transistor, a second compensation transistor, and a third compensation transistor. The drive transistor is connected between a first power supply line and a second power supply line. A first electrode of the first compensation transistor is electrically connected to a gate of the drive transistor. A gate of the first compensation transistor is electrically connected to a scan line. A first electrode of the second compensation transistor is electrically connected to a second electrode of the first compensation transistor. A second electrode of the second compensation transistor is electrically connected to a first electrode of the drive transistor or to a second electrode of the drive transistor. A gate of the second compensation transistor is electrically connected to a first control line. A first electrode of the third compensation transistor is electrically connected to the second electrode of the first compensation transistor and the first electrode of the second compensation transistor. A gate of the third compensation transistor is electrically connected to a second control line. A second electrode of the third compensation transistor is electrically connected to a first potential line. A plurality of the pixel circuits is arranged in an array. Each of the scan lines is electrically connected to two adjacent rows of the pixel circuits. Each of the first control lines is electrically connected to two adjacent rows of the pixel circuits. Each of the second control lines is electrically connected to two adjacent rows of the pixel circuits. Each of the third control lines is electrically connected to two adjacent rows of the pixel circuits. And, each of the fourth control lines is electrically connected to two adjacent rows of the pixel circuits.

DESCRIPTION OF SPECIFIC EMBODIMENTS OF THE INVENTION

In order to make the purpose, technical solutions and effects of the present disclosure clearer and more explicit, the present disclosure will be further described in detail below with reference to the accompanying drawings and by way of embodiments. It should be understood that the specific embodiments described herein are merely used to explain the present disclosure and are not intended to limit the present disclosure.

Figure 1:
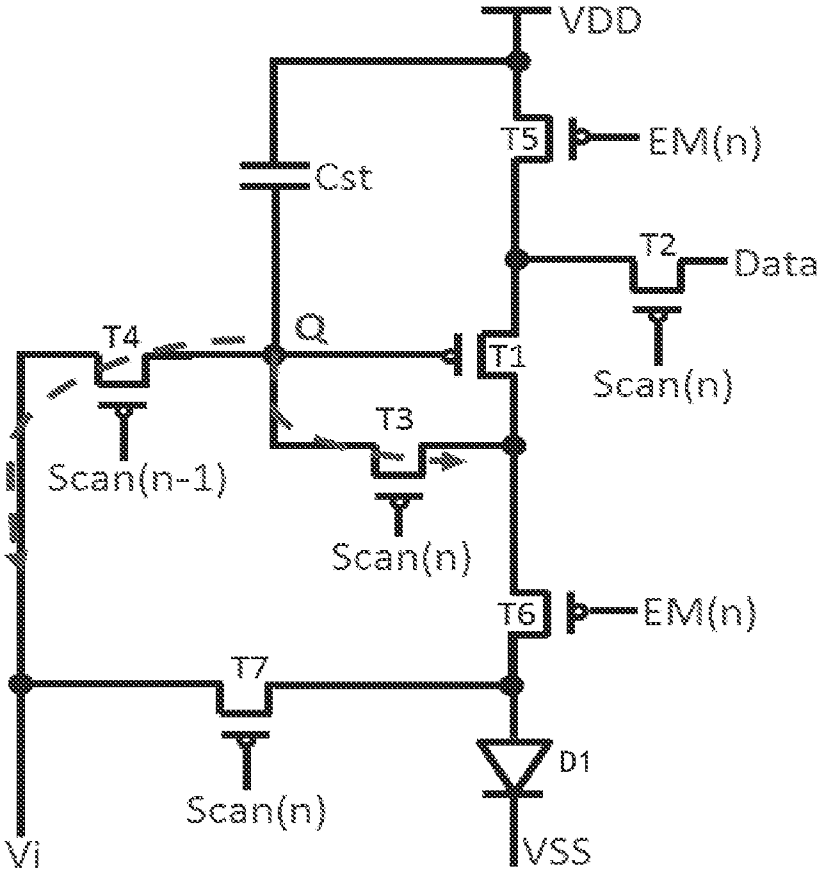
FIG. 1 is a schematic diagram of a structure of a pixel circuit in the related art.

FIG. 1 is a schematic diagram of a structure of a pixel circuit in the related art. The pixel circuit includes a drive transistor T1, a compensation transistor T3, a first light-emitting control transistor T6, a second light-emitting control transistor T5, a first initialization transistor T7, a second initialization transistor T4, a write transistor T2, a storage capacitor Cst, and at least one of light-emitting devices D1.

One end of the storage capacitor Cst is electrically connected to a first power supply line, and another end of the storage capacitor Cst is electrically connected to a gate of the drive transistor T1.

One of a source or a drain of the second light-emitting control transistor T5 is electrically connected to the first power supply line, another one of the source or the drain of the second light-emitting control transistor T5 is electrically connected to one of a source or a drain of the drive transistor T1, and a gate of the second light-emitting control transistor T5 is electrically connected to a light-emitting control line.

One of a source or a drain of the write transistor T2 is electrically connected to another one of the source or the drain of the second light-emitting control transistor T5, another one of the source or the drain of the write transistor T2 is connected to a data line, and a gate of the write transistor T2 is electrically connected to a first scan line.

One of a source or a drain of the compensation transistor T3 is electrically connected to another one of the source or the drain of the drive transistor T1, another one of the source or the drain of the compensation transistor T3 is electrically connected to the gate of the drive transistor T1, and a gate of the compensation transistor T3 is electrically connected to the first scan line.

One of a source or a drain of the first light-emitting control transistor T6 is electrically connected to another one of the source or the drain of the drive transistor T1, a gate of the first light-emitting control transistor T6 is electrically connected to the light-emitting control line, and another one of the source or the drain of the first light-emitting control transistor T6 is electrically connected to an anode of the light-emitting device D1.

A cathode of the light-emitting device D1 is electrically connected to a second power supply line.

One of a source or a drain of the first initialization transistor T7 is electrically connected to the anode of the light-emitting device D1, another one of the source or the drain of the first initialization transistor T7 is connected to an initialization line, and a gate of the first initialization transistor T7 is electrically connected to the first scan line.

One of a source or a drain of the second initialization transistor T4 is electrically connected to the gate of the drive transistor T1, another one of the source or the drain of the second initialization transistor T4 is connected to the initialization line, and a gate of the second initialization transistor T4 is electrically connected to a second scan line.

The data line is configured to transmit a data signal Data. The first power supply line is configured to transmit a first power supply signal VDD, and the second power supply line is configured to transmit a second power supply signal VSS. A potential of the first power supply signal VDD is greater than a potential of the second power supply signal VSS. The light-emitting control line is configured to transmit a light-emitting control signal EM (n). The initialization line is configured to transmit an initialization signal Vi. The first scan line is configured to transmit a scan signal Scan (n). The second scan line is configured to transmit a scan signal Scan (n−1).

The drive transistor T1, the compensation transistor T3, the first light-emitting control transistor T6, the second light-emitting control transistor T5, the first initialization transistor T7, the second initialization transistor T4, and the write transistor T2 are all P-channel thin-film transistors and are low-temperature polysilicon thin-film transistors.

Figure 2:
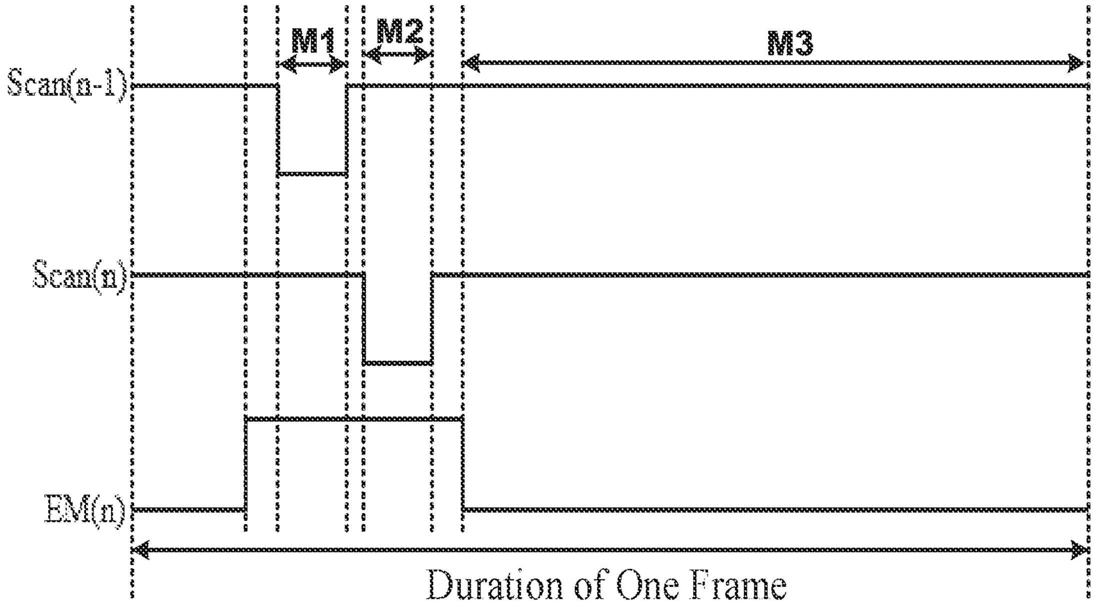
FIG. 2 is a timing diagram of the pixel circuit shown in FIG. 1.

The operation of the 7TIC pixel circuit described with reference to FIG. 1 during a frame can be divided into the following three main operation phases as shown in FIG. 2.

Reset phase M1: The scan signal Scan (n−1) is set to a low level, the second initialization transistor T4 is turned on, and the gate of the drive transistor T1 is reset to a potential of the initialization signal Vi.

Charging phase M2: The scan signal Scan (n) is set to a low level, the write transistor T2, the drive transistor T1, and the compensation transistor T3 are all turned on, and a potential of the gate of the drive transistor T1 is charged to Vdata-Vth; Meanwhile, the first initialization transistor T7 is turned on, and the anode of the light-emitting device is reset to a potential of the initialization signal Vi. Here, Vdata is a potential of the data signal Data, and Vth is a threshold voltage of the drive transistor T1.

Light-emitting phase M3: The light-emitting control signal EM (n) is set to a low level, and the light-emitting device emits light.

It should be noted that in the charging phase M2, the second initialization transistor T4, the first light-emitting control transistor T5, and the second light-emitting control transistor T6 are all turned off. At this time, the data signal Data charges the gate of the drive transistor T1 through the path of the writing transistor T2, the drive transistor T1, and the compensation transistor T3. When the potential of the gate of the drive transistor T1 is raised to Vdata-Vth, the drive transistor is turned off, and the potential of the gate thereof is no longer raised.

In the light-emitting phase M3, the light-emitting luminance of the light-emitting device is directly determined by the potential of the gate of the drive transistor T1, and the most important factor affecting the potential of the gate of the drive transistor T1 is the leakage current. Since the gate of the drive transistor T1 is connected to both the compensation transistor T3 and the second initialization transistor T4, the current leakage characteristics of these two transistors directly affect the luminance stability during the light-emitting phase. Since the leakage current of the low-temperature polysilicon thin-film transistor (LTPS TFT) is large, the potential of the gate (i.e., the point Q) of the drive transistor T1 is unstable within a duration of one frame (the two dotted lines in FIG. 1 indicate the corresponding leakage current path), which causes the Ids, i.e., the light-emitting current, flowing through the drive transistor T1 to change, thereby causing the brightness of the screen to change within a duration of one frame.

Figure 3:
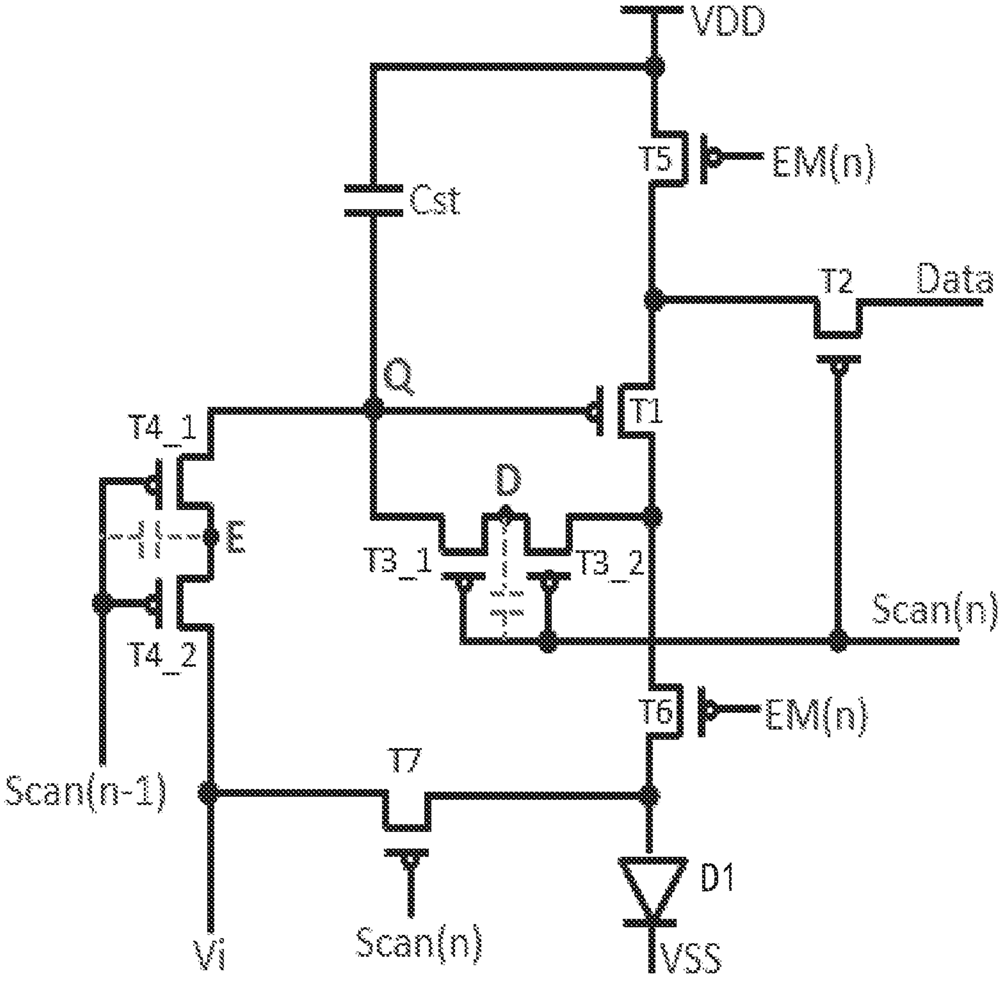
FIG. 3 is a schematic diagram of another structure of a pixel circuit in the related art.
Figure 4:
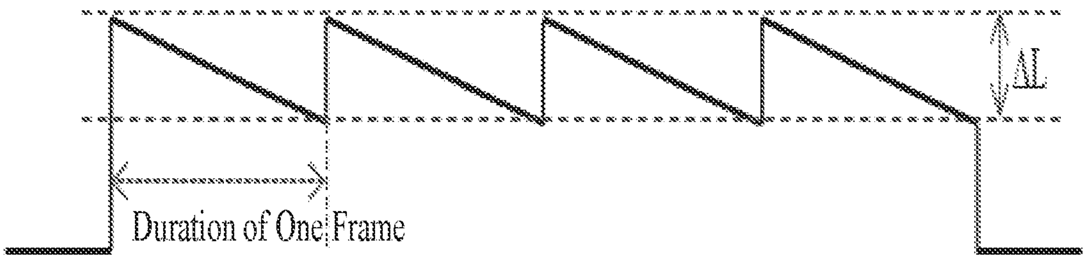
FIG. 4 is a schematic diagram showing luminance differences of a pixel circuit in a duration of one frame in the related art.

In view of this, in order to reduce the gate leakage current of the drive transistor T1, the related art improves the compensation transistor T3 and the second initialization transistor T4 in the pixel circuit to the structure of double gate thin-film transistors as shown in FIG. 3, mainly considering that leakage current of the double gate thin-film transistors is theoretically smaller than that of the single-gate thin-film transistor. However, in the actual manufacturing processes of display panels, it is difficult to avoid generating some parasitic capacitances. For example, a potential of the point D in the middle of the double gate thin-film transistors T3-1 and T3-2 and a potential of the point E in the middle of the double gate thin-film transistors T4-1 and T4-2, due to the coupling effect of parasitic capacitance, will be coupled into a higher potential than the potential at the point Q when the potential of the scan signal Scan (n−1) or the scan signal Scan (n) changes from low to high (that is, during the turn-off process of the corresponding transistor). In the subsequent light-emitting process, due to the leakage current of the transistor T3-1 and the transistor T4-1, the potential of the point Q is continuously increased, and the gate-source voltage difference (Vgs) corresponding to the drive transistor T1 is reduced, thereby causing the light-emitting luminance of the light-emitting device D1 to gradually decrease within a duration of one frame, as shown in FIG. 4, where the luminance of the light-emitting device D1 decreases by ΔL within a duration of one frame.

In addition, the related art employs a new LTPO (LTPS TFT+IGZO TFT) technique, in which the compensation transistor T3 and the second initialization transistor T4 in FIG. 1 are replaced with an indium gallium zinc oxide thin-film transistor (IGZO TFT) having a low leakage current, so as to solve the serious problem of flicker under low-frequency driving, such that a low-frequency driving scheme can be employed when a still frame is displayed, thereby finally achieving the purpose of reducing power consumption. However, the structures and processes of the back plate, which combines LTPS TFT and IGZO TFT together, are more complex and costlier.

Figure 5:
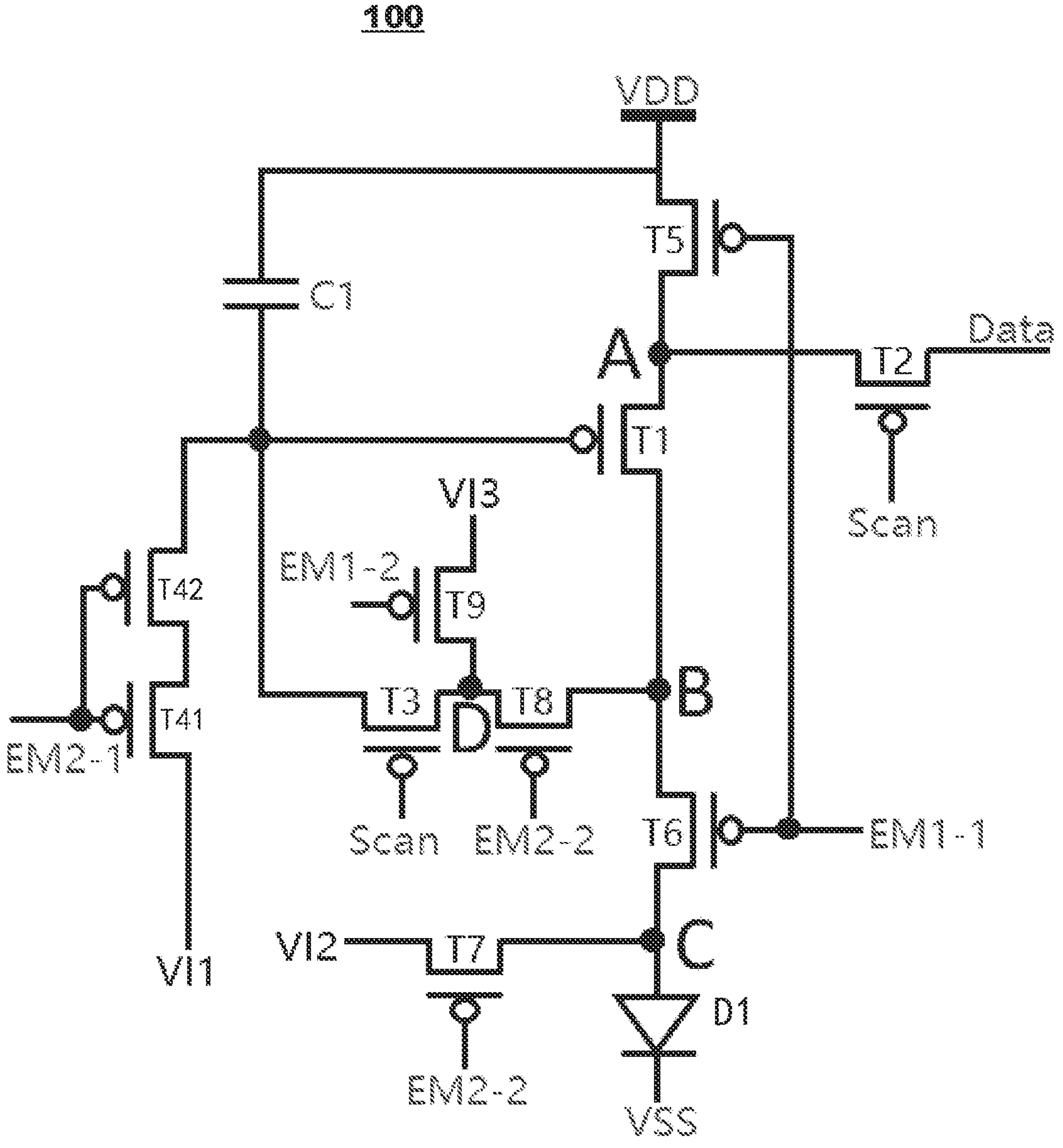
FIG. 5 is a schematic diagram of a structure of a pixel circuit according to an embodiment of the present disclosure.
Figure 6:
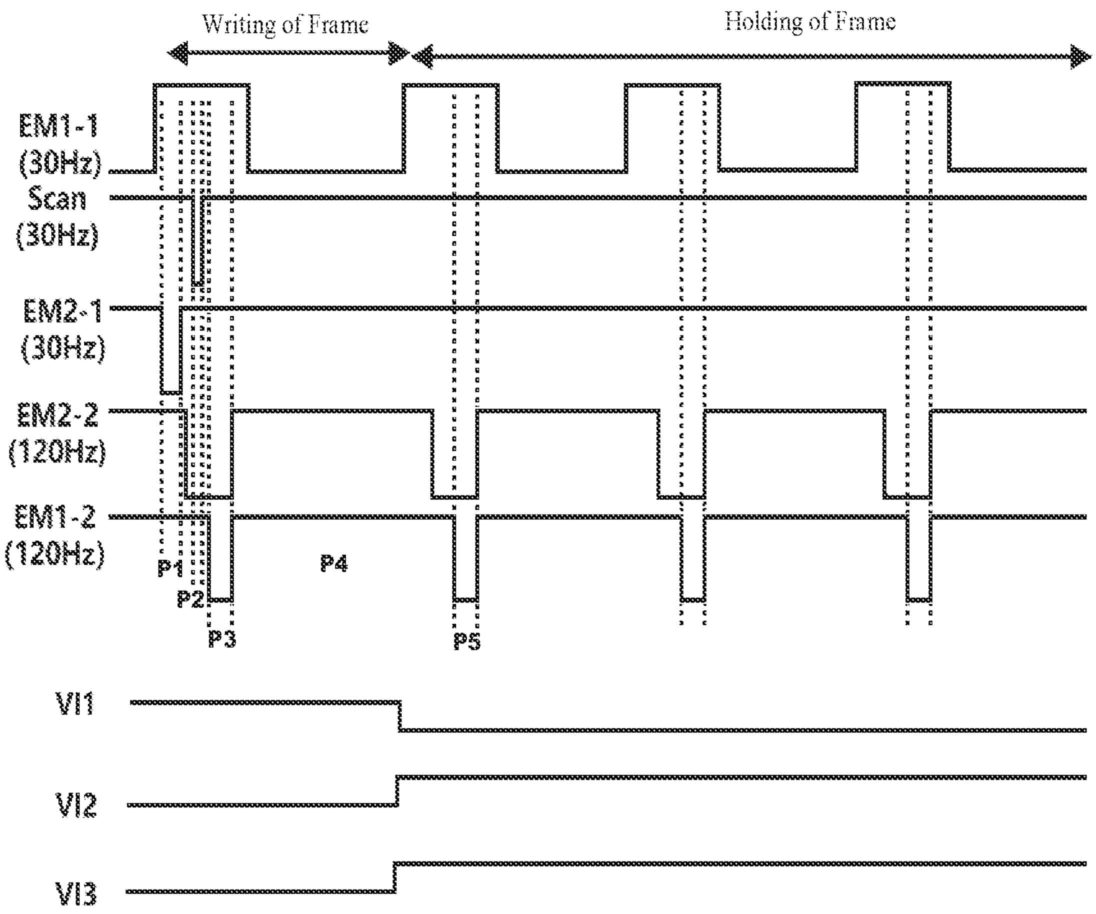
FIG. 6 is a timing diagram of the pixel circuit shown in FIG. 5.

In view of the above-mentioned deficiencies, the present embodiment provides a pixel circuit 100. Refer to FIGS. 5 and 6. As shown in FIG. 5, the pixel circuit 100 includes a drive transistor T1, a first compensation transistor T3, a second compensation transistor T8, and a third compensation transistor T9. The drive transistor T1 is connected between a first power supply line and a second power supply line. A first electrode of the first compensation transistor T3 is electrically connected to a gate of the drive transistor T1, and a gate of the first compensation transistor T3 is electrically connected to a scan line. A first electrode of the second compensation transistor T8 is electrically connected to a second electrode of the first compensation transistor T3, a second electrode of the second compensation transistor T8 is electrically connected to a first electrode of the drive transistor T1 or to a second electrode of the drive transistor T1, and a gate of the second compensation transistor T8 is electrically connected to a first control line. A first electrode of the third compensation transistor T9 is electrically connected to the second electrode of the first compensation transistor T3 and the first electrode of the second compensation transistor T8, a gate of the third compensation transistor T9 is electrically connected to a second control line, and a second electrode of the third compensation transistor T9 is electrically connected to a first potential line.

It will be appreciated that in the pixel circuit 100 provided in the present embodiment, the potential of the second electrode of the first compensation transistor T3 and the potential of the first electrode of the second compensation transistor T8 can be duly changed by the first potential line through the third compensation transistor T9 such that the voltage differences between the gate of the drive transistor T1 versus the second electrode of the first compensation transistor T3 and the first electrode of the second compensation transistor T8 are reduced, the gate leakage current of the drive transistor T1 is reduced, enabling the light-emitting current flowing through the drive transistor T1 to be more constant, thereby improving the uniformity of the intra-frame luminance.

Further, when the first compensation transistor T3 is in the off state and the second compensation transistor T8 and the third compensation transistor T9 are in the on state, the first potential line can change the potentials of the first electrode and the second electrode of the drive transistor T1 through the second compensation transistor T8 and the third compensation transistor T9, such that the unidirectional drift range of a threshold voltage of the drive transistor T1 in a single operating state is reduced, facilitating further maintaining of the stability of the light-emitting current flowing through the drive transistor T1.

It should be noted that in the present disclosure, the first electrode may be one of a source or a drain, and the second electrode may be another one of the source or the drain. For example, when the first electrode is a source, the second electrode is a drain. Alternatively, when the first electrode is a drain, the second electrode is a source.

In one embodiment thereof, the first potential line is configured to transmit the first potential signal VI3. In a duration of one frame the operation of the pixel circuit 100 includes writing the frame and holding the frame. A potential of the first potential signal VI3 during writing the frame is lower than that during holding the frame.

It should be noted that the potential of the first potential signal VI3 during writing the frame is lower than that during holding the frame, which not only facilitates lowering the gate leakage current of the drive transistor T1, but also facilitates changing a potential of point B and a potential of point A so as to reduce the unidirectional drift range of a threshold voltage of the drive transistor T1 in a single operating state. The potential of point B may be linked to the potential of point A by the drive transistor T1. That is, when the potential of one of point A or point B changes, the potential of another one of point A or point B changes accordingly.

In one embodiment, the pixel circuit 100 further includes a first light-emitting control transistor T6, a light-emitting device D1, and a reset transistor T7. A first electrode of the first light-emitting control transistor T6 is electrically connected to the second electrode of the drive transistor T1, and a gate of the first light-emitting control transistor T6 is electrically connected to a third control line. An anode of the light-emitting device D1 is electrically connected to a second electrode of the first light-emitting control transistor T6, and a cathode of the light-emitting device D1 is electrically connected to the second power supply line. A first electrode of the reset transistor T7 is electrically connected to the anode of the light-emitting device D1, a second electrode of the reset transistor T7 is electrically connected to a second potential line or the first potential line, and a gate of the reset transistor T7 is electrically connected to the gate of the second compensation transistor T8.

It should be noted that the gate of the reset transistor T7 is electrically connected to the gate of the second compensation transistor T8, such that the gate of the reset transistor T7 and the gate of the second compensation transistor T8 share the same first control line, thereby reducing the number of signal lines required by the pixel circuit 100, improving the density and aperture ratio of the pixel circuit 100.

Further, under the control of the first control line, the reset transistor T7 may be turned on multiple times at different phases of a frame to adjust or reset a potential of the anode of the light-emitting device D1 multiple times, which can improve the light-emitting luminance of the light-emitting device D1 and further improve the differences of intra-frame luminance.

The light-emitting device D1 may be one of an organic light-emitting diode, a quantum dot light-emitting diode, a micro light-emitting diode, or a mini light-emitting diode.

In one embodiment thereof, the second potential line transmits a second potential signal VI2. A potential of the second potential signal VI2 during writing a frame is lower than that during holding the frame.

It should be noted that the potential of the second potential signal VI2 during writing a frame is lower than that during holding the frame, which facilitates adjusting or resetting the potential of the anode of the light-emitting device D1 to further improve the differences of intra-frame luminance.

In one embodiment thereof, a channel type of the reset transistor T7 is same as a channel type of the second compensation transistor T8.

It should be noted that since the gate of the reset transistor T7 and the gate of the second compensation transistor T8 share the same first control line, the channel type of the reset transistor T7 being same as the channel type of the second compensation transistor T8 allows the reset transistor T7 and the second compensation transistor T8 to be in a synchronous state so as to enable the reset transistor T7 and the second compensation transistor T8 to be synchronously turned on multiple times in different phases within a frame.

In one embodiment, the pixel circuit 100 further includes a second light-emitting control transistor T5, a write transistor T2, and a first initialization transistor T41. A first electrode of the second light-emitting control transistor T5 is electrically connected to the first power supply line, a second electrode of the second light-emitting control transistor T5 is electrically connected to the first electrode of the drive transistor T1, and a gate of the second light-emitting control transistor T5 is electrically connected to the gate of the first light-emitting control transistor T6. A first electrode of the write transistor T2 is electrically connected to a data line, a gate of the write transistor T2 is electrically connected to the scan line, and a second electrode of the write transistor T2 is electrically connected to the first electrode of the drive transistor T1 or the second electrode of the drive transistor T1. A first electrode of the first initialization transistor T41 is electrically connected to the gate of the drive transistor T1, a gate of the first initialization transistor T41 is electrically connected to a fourth control line, and a second electrode of the first initialization transistor T41 is electrically connected to one of a third potential line, the first potential line, or the second potential line.

It should be noted that the gate of the second light-emitting control transistor T5 is electrically connected to the gate of the first light-emitting control transistor T6, such that it can be achieved that the gate of the second light-emitting control transistor T5 and the gate of the first light-emitting control transistor T6 can share the same third control line, thereby reducing the number of signal lines required by the pixel circuit 100, improving of the density and aperture ratio of the pixel circuit 100.

Further, the gate of the write transistor T2 is electrically connected to the scan line, such that it can be achieved that the gate of the write transistor T2 and the gate of the first compensation transistor T3 can share the same scan line, thereby reducing the number of signal lines required by the pixel circuit 100, improving the density and the aperture ratio of the pixel circuit 100.

Further, when the second electrode of the first initialization transistor T41 is electrically connected to the first potential line or the second potential line, the first initialization transistor T41 may share the same potential line with the third compensation transistor T9 or the reset transistor T7, thereby reducing the number of signal lines required by the pixel circuit 100, improving the density and the aperture ratio of the pixel circuit 100.

In one embodiment, the pixel circuit 100 further includes a second initialization transistor T42. A first electrode of the second initialization transistor T42 is electrically connected to the gate of the drive transistor T1, a gate of the second initialization transistor T42 is electrically connected to the gate of the first initialization transistor T41, and a second electrode of the second initialization transistor T42 is electrically connected to the first electrode of the first initialization transistor T41 and the first electrode of the third compensation transistor T9.

It should be noted that the second electrode of the second initialization transistor T42 is electrically connected to the first electrode of the first initialization transistor T41 and the first electrode of the third compensation transistor T9, the stability of a potential of a connection node between the second electrode of the second initialization transistor T42 and the first electrode of the first initialization transistor T41 can also be improved, and the potential difference between the connection node and the gate of the drive transistor T1 can be reduced such that the gate leakage current of the drive transistor T1 is decreased, thereby improving the differences of intra-frame luminance.

In one embodiment, at least two of a channel type of the drive transistor T1, a channel type of the first compensation transistor T3, a channel type of the second compensation transistor T8, a channel type of the third compensation transistor T9, a channel type of the first light-emitting control transistor T6, a channel type of the reset transistor T7, a channel type of the second light-emitting control transistor T5, a channel type of the write transistor T2, a channel type of the first initialization transistor T41, and a channel type of the second initialization transistor T42 are the same.

It should be noted that the same channel type of these transistors facilitates simplified fabrication processes, structures, and costs. Here, the channel type may be a P-channel or an N-channel.

In one embodiment, at least two of the drive transistor T1, the first compensation transistor T3, the second compensation transistor T8, the third compensation transistor T9, the first light-emitting control transistor T6, the reset transistor T7, the second light-emitting control transistor T5, the write transistor T2, the first initialization transistor T41, and the second initialization transistor T42 are low-temperature polysilicon thin-film transistors.

It should be noted that the channel materials of these transistors are all low-temperature polysilicon, which is advantageous not only for improving the dynamic performance of the pixel circuit 100, but also for further simplifying the fabrication processes, structures and costs. Each of the above-mentioned transistors being a low-temperature polysilicon thin-film transistor may serve as a preferable solution, but is not limited thereto. At least one of the above-mentioned transistors may also be an indium gallium zinc oxide thin-film transistor.

In one embodiment thereof, the pixel circuit 100 further includes a storage capacitor C1. One end of the storage capacitor C1 is electrically connected to the first power supply line, and another end of the storage capacitor C1 is electrically connected to the gate of the drive transistor T1.

It should be noted that the first power supply line is configured to transmit a first power supply signal VDD, and the second power supply line is configured to transmit a second power supply signal VSS. A potential of the first power supply signal VDD is higher than that of the second power supply signal VSS. The data line is configured to transmit a data signal Data. The first potential line is configured to transmit a first potential signal VI3. The second potential line is configured to transmit a second potential signal VI2. The third potential line is configured to transmit a third potential signal VI1. The scan line is configured to transmit a scan signal Scan. The first control line is configured to transmit a first control signal EM2-2. The second control line is configured to transmit a second control signal EM1-2. The third control line is configured to transmit a third control signal EM1-1. The fourth control line is configured to transmit a fourth control signal EM2-1.

It should be noted that, as shown in FIG. 6, when the above pixel circuit 100 operates at the highest refresh frequency, in a duration of one frame the operation of the pixel circuit 100 includes only writing the frame and does not include holding the frame; when the above pixel circuit 100 operates at a lower refresh frequency (lower than the highest refresh frequency), in a duration of one frame of the operation of the pixel circuit 100 includes writing the frame and holding the frame. The operation process in a duration of one frame of the pixel circuit 100 will be described below with reference to a state in which the pixel circuit 100 operates at the lower refresh frequency as an example.

The writing of the frame includes the following phases.

Phase P1: The third control signal EM1-1 is high, and the first light-emitting control transistor T6 and the second light-emitting control transistor T5 are turned off. The scan signal Scan is high, and the write transistor T2 and the first compensation transistor T3 are turned off. The first control signal EM2-2 is high, and the second compensation transistor T8 and the reset transistor T7 are turned off. The second control signal EM1-2 is high, and the third compensation transistor T9 is turned off. The fourth control signal EM2-1 is low, and the first initialization transistor T41 and the second initialization transistor T42 are turned on. The third potential signal VI1 resets the gate of the drive transistor T1 or the other end of the storage capacitor C1.

Writing phase P2: the third control signal EM1-1 is high, and the first light-emitting control transistor T6 and the second light-emitting control transistor T5 are turned off. The second control signal EM1-2 is high, and the third compensation transistor T9 is turned off. The fourth control signal EM2-1 is high, and the first initialization transistor T41 and the second initialization transistor T42 are turned off. The scan signal Scan is high, and the write transistor T2 and the first compensation transistor T3 are turned on. The first control signal EM2-2 is low, and the second compensation transistor T8 and the reset transistor T7 are turned on. The data signal Data is written to the gate of the drive transistor T1 through the write transistor T2, the drive transistor T1, the second compensation transistor T8 and the first compensation transistor T3 in sequence. Meanwhile, the second potential signal VI2 resets the anode of the light-emitting device D1 via the reset transistor T7.

First compensation phase P3: The third control signal EM1-1 is high, and the first light-emitting control transistor T6 and the second light-emitting control transistor T5 are turned off. The scan signal Scan is high, and the write transistor T2 and the first compensation transistor T3 are turned on. The fourth control signal EM2-1 is high, and the first initialization transistor T41 and the second initialization transistor T42 are turned off. The second control signal EM1-2 is low, and the third compensation transistor T9 is turned on. The first control signal EM2-2 is low, and the second compensation transistor T8 and the reset transistor T7 are turned on, such that the potential of the second electrode of the first compensation transistor T3 is stabilized, a voltage difference between a potential of the gate of the drive transistor T1 and the potential of the second electrode of the first compensation transistor T3 is reduced to reduce the leakage current of the first compensation transistor T3, and a potential of the first electrode of the drive transistor T1 and a potential of the second electrode of the drive transistor T1 are reset to improve the operation state of the drive transistor T1, thereby avoiding that a threshold voltage thereof is shifted towards a positive or negative direction due to being under a same stress state for a long time.

First light-emitting phase P4: The third control signal EM1-1 is low, and the first light-emitting control transistor T6 and the second light-emitting control transistor T5 are turned on. The drive transistor T1 is turned on, and the other transistors are turned off. The light-emitting device D1 emits light.

The holding of the frame includes the following phases:

Second compensation phase P5: The second compensation phase P5 repeats the operations of the above first compensation phase P3 such that the potential of the second electrode of the first compensation transistor T3 is stabilized, the voltage difference between the potential of the gate of the drive transistor T1 and the potential of the second electrode of the first compensation transistor T3 is reduced, and the potential of the first electrode of the drive transistor T1 and the potential of the second electrode of the drive transistor T1 are reset. Meanwhile, the potential of the anode of the light-emitting device D1 is reset multiple times.

Second light-emitting phase: The second light-emitting phase is between two adjacent second compensation phases P5 to implement the light emission by the light-emitting device D1.

It should be noted that the potential of the first potential signal VI3 may also be kept consistent during writing the frame and holding the frame, and the range thereof may be 0~7.6V. The potential of the second potential signal VI2 may also be kept consistent during writing the frame and holding the frame, and the range thereof may be 0~−6V. A potential of the third potential signal VI1 may be kept consistent during writing the frame and holding the frame, or the potential of the third potential signal VI1 during writing the frame may be higher than that during holding the frame, and the range thereof may be 0~−6V.

In one embodiment, the present embodiment provides a display panel including the pixel circuit 100 in at least one embodiment described above. A plurality of the pixel circuits 100 are arranged in an array. Each of the scan lines is electrically connected to two adjacent rows of the pixel circuits 100. Each of the first control lines is electrically connected to two adjacent rows of the pixel circuits 100. Each of the second control lines is electrically connected to two adjacent rows of the pixel circuits 100. Each of the third control lines is electrically connected to two adjacent rows of the pixel circuits 100. Each of the fourth control lines is electrically connected to two adjacent rows of the pixel circuits 100.

It will be appreciated that according to the display panel provided in the present embodiment, the potential of the second electrode of the first compensating transistor T3 and the potential of the first electrode of the second compensating transistor T8 can be duly changed by the first potential line through the third compensating transistor T9, such that the voltage differences between the gate of the drive transistor T1 versus the second electrode of the first compensating transistor T3 and the first electrode of the second compensating transistor T8 are reduced, the gate leakage current of the drive transistor T1 is reduced, enabling the light-emitting current flowing through the drive transistor T1 to be more constant, thereby improving the uniformity of the intra-frame luminance.

Further, when the first compensation transistor T3 is in the off state and the second compensation transistor T8 and the third compensation transistor T9 are in the on state, the first potential line may change the potentials of the first electrode and the second electrode of the drive transistor T1 through the second compensation transistor T8 and the third compensation transistor T9, such that the unidirectional drift range of a threshold voltage of the drive transistor T1 in a single operating state is reduced, facilitating further maintaining of the stability of the light-emitting current flowing through the drive transistor T1.

Further, since adjacent two rows of the pixel circuits 100 can share a same scan line, and the adjacent two rows of the pixel circuits 100 can share the same first control line, second control line, third control line, and fourth control line, the display panel can further reduce the number of signal lines required, thereby improving the pixel density and aperture ratio of the display panel.

Figure 7:
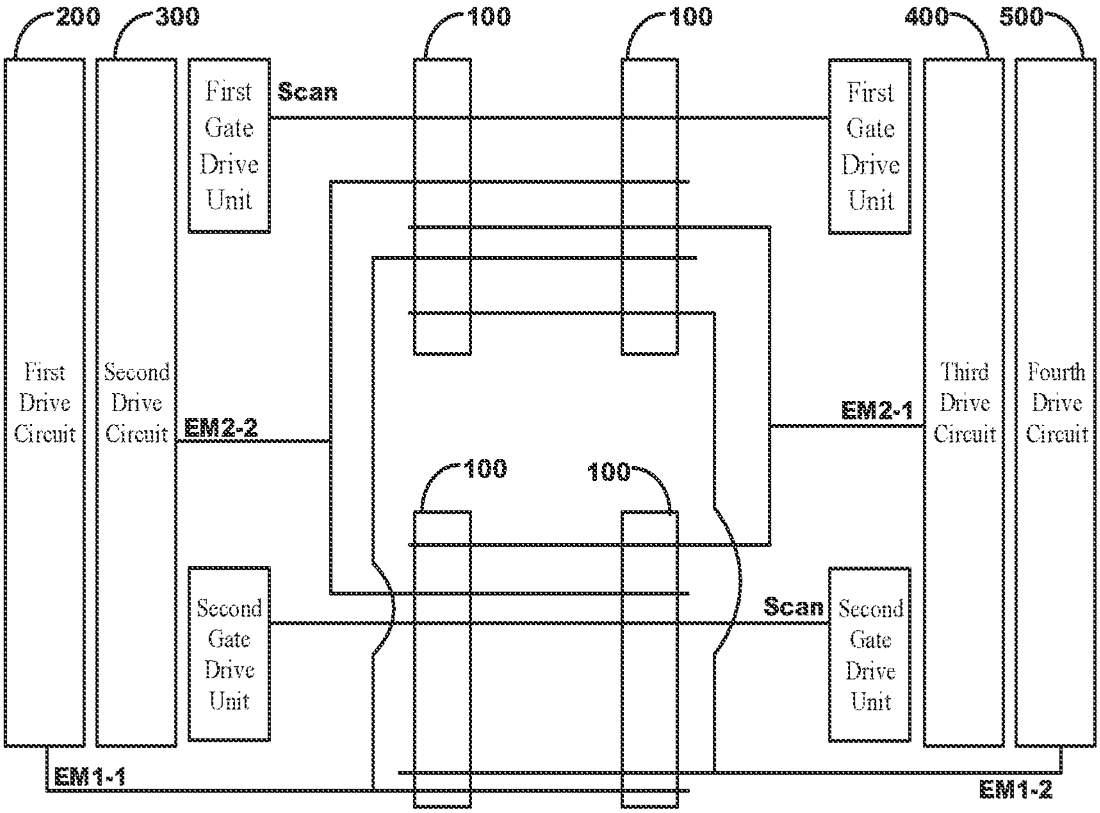
FIG. 7 is a schematic diagram of a structure of a display panel according to an embodiment of the present disclosure.

In one embodiment, as shown in FIG. 7, the display panel further includes two gate drive circuits, a first drive circuit 200, a second drive circuit 300, a third drive circuit 400, and a fourth drive circuit 500, where one of the gate drive circuits is electrically connected to an end of the scan line and another one of the gate drive circuits is electrically connected to another end of the scan line; the first drive circuit 200 is electrically connected to the third control line; the second drive circuit 300 is electrically connected to the first control line; the third drive circuit 400 is electrically connected to the fourth control line; the fourth drive circuit 500 is electrically connected to the second control line; where the two gate drive circuits are located on both sides of the plurality of the pixel circuits 100, respectively, two of the first drive circuit 200, the second drive circuit 300, the third drive circuit 400, and the fourth drive circuit 500 are located on an outer side of one of the gate drive circuits, and the other two of the first drive circuit 200, the second drive circuit 300, the third drive circuit 400, and the fourth drive circuit 500 are located on an outer side of the other of the gate drive circuits.

It should be noted that the layout of the present embodiment not only enables the normal driving of the pixel circuit 100, but also facilitates the layout design of each circuit and the narrow edge.

Each gate drive circuit includes a plurality of cascaded gate drive units, for example, a first gate drive unit and a second gate drive unit, and so on. Each scan line is electrically connected to two corresponding gate drive units to improve the drive capability of the scan signal Scan.

It will be appreciated by those of ordinary skill in the art that equivalents may be substituted or altered in accordance with the technical solution of the present disclosure and its inventive concept, and all such variations or substitutions are intended to fall within the scope of the claims appended hereto.

What is claimed is:

1. A pixel circuit, wherein the pixel circuit comprises:
- a drive transistor connected between a first power supply line and a second power supply line;
- a first compensation transistor, a first electrode of the first compensation transistor being electrically connected to a gate of the drive transistor, and a gate of the first compensation transistor being electrically connected to a scan line;
- a second compensation transistor, a first electrode of the second compensation transistor being electrically connected to a second electrode of the first compensation transistor, a second electrode of the second compensation transistor being electrically connected to a first electrode of the drive transistor or to a second electrode of the drive transistor, and a gate of the second compensation transistor being electrically connected to a first control line;
- a third compensation transistor, a first electrode of the third compensation transistor being electrically connected to the second electrode of the first compensation transistor and the first electrode of the second compensation transistor, a gate of the third compensation transistor being electrically connected to a second control line, and a second electrode of the third compensation transistor being electrically connected to a first potential line, wherein a channel type of the drive transistor, a channel type of the first compensation transistor, a channel type of the second compensation transistor, and a channel type of the third compensation transistor are the same.

2. The pixel circuit of claim 1, wherein the pixel circuit further comprises:
- a first light-emitting control transistor, a first electrode of the first light-emitting control transistor being electrically connected to the second electrode of the drive transistor, and a gate of the first light-emitting control transistor being electrically connected to a third control line;
- a light-emitting device, an anode of the light-emitting device being electrically connected to a second electrode of the first light-emitting control transistor, and a cathode of the light-emitting device being electrically connected to the second power supply line;
- a reset transistor, a first electrode of the reset transistor being electrically connected to the anode of the light-emitting device, a second electrode of the reset transistor being electrically connected to a second potential line or to the first potential line, and a gate of the reset transistor being electrically connected to the gate of the second compensation transistor.

3. The pixel circuit of claim 2, wherein a channel type of the reset transistor and a channel type of the second compensation transistor are the same.

4. The pixel circuit of claim 2, wherein the pixel circuit further comprises:
- a second light-emitting control transistor, a first electrode of the second light-emitting control transistor being electrically connected to the first power supply line, a second electrode of the second light-emitting control transistor being electrically connected to the first electrode of the drive transistor, and a gate of the second light-emitting control transistor being electrically connected to the gate of the first light-emitting control transistor;
- a write transistor, a first electrode of the write transistor being electrically connected to a data line, a gate of the write transistor being electrically connected to the scan line, and a second electrode of the write transistor being electrically connected to the first electrode of the drive transistor or to the second electrode of the drive transistor;
- a first initialization transistor, a first electrode of the first initialization transistor being electrically connected to the gate of the drive transistor, a gate of the first initialization transistor being electrically connected to a fourth control line, and a second electrode of the first initialization transistor being electrically connected to one of a third potential line, the first potential line, or the second potential line.

5. The pixel circuit of claim 4, wherein the pixel circuit further comprises:
- a second initialization transistor, a first electrode of the second initialization transistor being electrically connected to the gate of the drive transistor, a gate of the second initialization transistor being electrically connected to the gate of the first initialization transistor, and a second electrode of the second initialization transistor being electrically connected to the first electrode of the first initialization transistor and the first electrode of the third compensation transistor.

6. The pixel circuit of claim 5, wherein the drive transistor, the first compensation transistor, the second compensation transistor, the third compensation transistor, the first light-emitting control transistor, the reset transistor, the second light-emitting control transistor, the write transistor, the first initialization transistor, and the second initialization transistor are all low-temperature polysilicon thin-film transistors.

7. The pixel circuit of claim 2, wherein in a writing phase of operation of the pixel circuit, the first compensation transistor and the second compensation transistor are both in an on state and the third compensation transistor is in an off state such that a data signal is transmitted to the gate of the drive transistor.

8. The pixel circuit of claim 7, wherein in a first compensation phase of the pixel circuit, the first compensation transistor is in an off state, the second compensation transistor and the third compensation transistor are both in an on state such that a potential of the second electrode of the first compensation transistor is stabilized, a voltage difference between a potential of the gate of the drive transistor and the potential of the second electrode of the first compensation transistor is reduced, and a potential of the first electrode of the drive transistor and a potential of the second electrode of the drive transistor are reset.

9. The pixel circuit of claim 8, wherein in a duration of one frame, the operation of the pixel circuit comprises writing the frame and holding the frame, and the writing phase and the first compensation phase are both in the writing of the frame; and wherein holding the frame comprises a plurality of second compensation phases in each of which the first compensation transistor is in an off state, and the second compensation transistor and the third compensation transistor are both in an on state such that the potential of the second electrode of the first compensation transistor is stabilized, the voltage difference between the potential of the gate of the drive transistor and the potential of the second electrode of the first compensation transistor is reduced, and the potential of the first electrode of the drive transistor and the potential of the second electrode of the drive transistor are reset.

10. The pixel circuit of claim 9, wherein the reset transistor is in the on state during the writing phase, the first compensation phase, and the second compensation phase such that a potential of the anode of the light-emitting device is reset multiple times.

11. The pixel circuit of claim 2, wherein the second potential line transmits a second potential signal; in a duration of one frame, the operation of the pixel circuit comprises writing the frame and holding the frame, and a potential of the second potential signal during writing the frame is lower than that during holding the frame.

12. The pixel circuit of claim 1, wherein the first potential line transmits a first potential signal; in a duration of one frame, operation of the pixel circuit comprises writing the frame and holding the frame, and a potential of the first potential signal during writing the frame is lower than that during holding the frame.

13. A display panel, wherein the display panel comprises a pixel circuit, the pixel circuit comprises:

a drive transistor connected between a first power supply line and a second power supply line;

a first compensation transistor, a first electrode of the first compensation transistor being electrically connected to a gate of the drive transistor, and a gate of the first compensation transistor being electrically connected to a scan line;

a second compensation transistor, a first electrode of the second compensation transistor being electrically connected to a second electrode of the first compensation transistor, a second electrode of the second compensation transistor being electrically connected to a first electrode of the drive transistor or to a second electrode of the drive transistor, and a gate of the second compensation transistor being electrically connected to a first control line;

a third compensation transistor, a first electrode of the third compensation transistor being electrically connected to the second electrode of the first compensation transistor and the first electrode of the second compensation transistor, a gate of the third compensation transistor being electrically connected to a second control line, and a second electrode of the third compensation transistor being electrically connected to a first potential line, wherein a plurality of the pixel circuits are arranged in an array; each of the scan lines is electrically connected to two adjacent rows of the pixel circuits; each of the first control lines is electrically connected to two adjacent rows of the pixel circuits; each of the second control lines is electrically connected to two adjacent rows of the pixel circuits; each of the third control lines is electrically connected to two adjacent rows of the pixel circuits; and each of the fourth control lines is electrically connected to two adjacent rows of the pixel circuits.

14. The display panel of claim 13, wherein the display panel further comprises:

two gate drive circuits, one of the gate drive circuits being electrically connected to an end of the scan line and another one of the gate drive circuits being electrically connected to another end of the scan line;

a first drive circuit being electrically connected to the third control line;

a second drive circuit being electrically connected to the first control line;

a third drive circuit being electrically connected to the fourth control line;

a fourth drive circuit being electrically connected to the second control line;

wherein the two gate drive circuits are located on both sides of the plurality of the pixel circuits, respectively, two of the first drive circuit, the second drive circuit, the third drive circuit, and the fourth drive circuit are located on an outer side of one of the gate drive circuits, and another two of the first drive circuit, the second drive circuit, the third drive circuit, and the fourth drive circuit are located on an outer side of another one of the gate drive circuits.

15. The display panel of claim 13, wherein a channel type of the drive transistor, a channel type of the first compensation transistor, a channel type of the second compensation transistor, and a channel type of the third compensation transistor are the same.

16. The display panel of claim 15, wherein a channel type of the reset transistor and a channel type of the second compensation transistor are the same.

17. The display panel of claim 16, wherein the pixel circuit further comprises:

a second initialization transistor, a first electrode of the second initialization transistor being electrically connected to the gate of the drive transistor, a gate of the second initialization transistor being electrically connected to the gate of the first initialization transistor, and a second electrode of the second initialization transistor being electrically connected to the first electrode of the first initialization transistor and the first electrode of the third compensation transistor.

18. The display panel of claim 15, wherein the pixel circuit further comprises:

a second light-emitting control transistor, a first electrode of the second light-emitting control transistor being electrically connected to the first power supply line, a second electrode of the second light-emitting control transistor being electrically connected to the first electrode of the drive transistor, and a gate of the second light-emitting control transistor being electrically connected to the gate of the first light-emitting control transistor;

a write transistor, a first electrode of the write transistor being electrically connected to a data line, a gate of the write transistor being electrically connected to the scan line, and a second electrode of the write transistor being electrically connected to the first electrode of the drive transistor or to the second electrode of the drive transistor;

a first initialization transistor, a first electrode of the first initialization transistor being electrically connected to the gate of the drive transistor, a gate of the first initialization transistor being electrically connected to a fourth control line, and a second electrode of the first initialization transistor being electrically connected to one of a third potential line, the first potential line, or the second potential line.

19. The display panel of claim 13, wherein the pixel circuit further comprises:

a first light-emitting control transistor, a first electrode of the first light-emitting control transistor being electrically connected to the second electrode of the drive transistor, and a gate of the first light-emitting control transistor being electrically connected to a third control line;

a light-emitting device, an anode of the light-emitting device being electrically connected to a second electrode of the first light-emitting control transistor, and a cathode of the light-emitting device being electrically connected to the second power supply line;

a reset transistor, a first electrode of the reset transistor being electrically connected to the anode of the light-emitting device, a second electrode of the reset transistor being electrically connected to a second potential line or to the first potential line, and a gate of the reset transistor being electrically connected to the gate of the second compensation transistor.

* * * * *